United States Patent
Anderton et al.

(10) Patent No.: US 11,309,759 B2
(45) Date of Patent: Apr. 19, 2022

(54) CONDUCTOR BAR

(71) Applicant: GE Renewable Technologies, Grenoble (FR)

(72) Inventors: Alexander Anderton, Birr AG (CH); Markus Huwyler, Muri (CH); Andreas Köpfler, Weilheim (DE); Armin Fubel, Baden (CH)

(73) Assignee: GE Renewable Technologies, Grenoble (FR)

( * ) Notice: Subject to any disclaimer, the term of this patent is extended or adjusted under 35 U.S.C. 154(b) by 0 days.

(21) Appl. No.: 17/016,474

(22) Filed: Sep. 10, 2020

(65) Prior Publication Data

US 2021/0083538 A1 Mar. 18, 2021

(30) Foreign Application Priority Data

Sep. 12, 2019 (EP) ..................... 19306100

(51) Int. Cl.
  *H02K 3/40* (2006.01)
  *H02K 3/04* (2006.01)
(52) U.S. Cl.
  CPC ...................... *H02K 3/04* (2013.01)
(58) Field of Classification Search
  CPC .. H02K 3/30; H02K 3/32; H02K 3/34; H02K 3/40; H02K 3/345
  See application file for complete search history.

(56) References Cited

U.S. PATENT DOCUMENTS

| | | | | |
|---|---|---|---|---|
| 2,705,292 | A * | 3/1955 | Wagenseil | H02K 3/40 310/196 |
| 6,043,582 | A * | 3/2000 | Markovitz | H02K 3/30 310/196 |
| 6,768,240 | B2 * | 7/2004 | Younsi | H02K 3/14 310/201 |
| 7,804,218 | B2 * | 9/2010 | Higashimura | H01B 1/24 310/215 |
| 2008/0230253 | A1 | 9/2008 | Williams et al. | |

OTHER PUBLICATIONS

European Search Report Corresponding to EP19306100 dated Feb. 27, 2020.

* cited by examiner

*Primary Examiner* — Dang D Le
(74) *Attorney, Agent, or Firm* — Dority & Manning, P.A.

(57) ABSTRACT

A conductor bar for a stator winding of a rotating electrical machine includes a bundle of parallel conductor strands extending between two ends of the conductor bar and spaced apart by interspaces. A main insulation is wound around the bundle of conductor strands and a stack separators fills at least part of the interspaces. Protection elements are between the bundle of conductor strands and the main insulation. At least one of the protection elements or the stack separators are configured to compensate, at least in part, thermal expansion of the conductor elements when temperature changes.

25 Claims, 2 Drawing Sheets

CONDUCTOR BAR

TECHNICAL FIELD

The present invention concerns a conductor bar for the stator windings of a rotating electric machine, which notably can include a generator or a motor.

In particular the present invention concerns a conductor bar for which debonding between the green bar and the isolation wound around the green bar is avoided.

PRIOR ART

A conductor bar for the stator windings of a rotating electric machine, known from prior art, is generally composed of a bundle of conductor strands (also called "green bar") which are spaced apart from one another, and are electrically insulating from one another, notably by a woven fabric filling the conductor strand interspaces. Said woven fabric can be impregnated by an epoxy resin or varnished.

The conductor strands are generally stacked in two or more adjacent columns said, respectively, first and second column, so that the cross section of the bundle of conductor strands, according to a section plan perpendicular to the elongation direction of said bundle, has a rectangular shape. To this regard, the conductor strands are arranged so that said cross section of rectangular shape defines two lateral sides parallel to the stacking direction and connected by two narrow sides.

The conductor bar further comprises a main insulation, for example a laminated main insulation wound around the bundle of conductor strands. In particular, the main insulation is in direct contact with the conductor strands on the lateral sides, whereas two protection elements, also called "inner corona protection element", are intercalated in between the narrow sides and the main insulation.

However, this conductor bar is unsatisfactory.

Indeed the mismatch between the coefficients of thermal expansion of the conductor strands and the main insulation renders them sensitive to thermal stress, and in particular at the interface between the conductor strands and the main insulation. Thermal stress undergone by the conductor bar stems from frequent starts and stops of the machine. Laboratory tests designed to reproduce the impact on the bars are referred to as thermal cycling tests.

It is then required that the conductor bar be designed to meet the IEEE 1310 standard before being mounted in a stator of a rotating electrical machine.

Notably, this standard defines a test that comprises 500 thermal cycles in the 40° C.-155° C.-40° C. temperature range.

Furthermore, the inner corona protection elements are generally conductive, and their exposed corners have to be rounded to avoid any electrical field enhancement that would occur in case of sharp corners. This rounding of the exposed corners of the inner corona protection elements imposes however additional manufacturing steps.

It is therefore an object of the invention to propose a conductor bar less sensitive to thermal stress.

It is also an object of the invention to propose a conductor bar wherein debonding of the main insulation is avoided when implemented in a stator of a rotating electrical machine.

It is also an object of the invention to propose a conductor bar for which the rounding of the exposed corners of the protection element can be avoided.

SUMMARY OF THE INVENTION

The aforementioned objects are, at least partly, achieved by a conductor bar for a stator winding of a rotating electrical machine comprising:
- a bundle of parallel conductor strands extending between two ends of the conductor bar, spaced apart by inter spaces;
- a main insulation wound around the bundle of conductor strands;
- a stack separator filling, at least in part, the interspaces
- two protection elements intercalated in between the bundle of conductor strands and the insulation wound around said bundle;
- at least one of the protection elements and/or the stack separator are configured to compensate, at least in part, the thermal expansion of the conductor elements when temperature changes, advantageously in the 40° C. to 155° C. temperature range.

According to one embodiment, at least one of the protection elements and/or the stack separator have a Young modulus adjusted so that said at least one element and/or stack separator compensate, at least in part, the thermal expansion of the conductor elements when heated, advantageously the Young modulus is lower than 100 MPa, more advantageously lower than 50 MPa.

So, the protecting elements and/or the stack separator, during thermal expansion of the conductor strands, can be compressed, and therefore partially absorb the mechanical stress stemming from temperature change. Furthermore, the exposed corners of the protection elements, because of their elasticity, can deform upon the application of the main insulation, and adopt a rounded shape.

According to one embodiment, the stack separator comprises a woven fabric laminated or impregnated with an elastic or flexible material, advantageously the elastic or flexible material comprises at least one of the element chosen among: an elastomer, for example silicon rubber based material, flexible epoxy resin, polyurethane resin.

According to one embodiment, at least one of the two protection elements comprise an elastic or flexible material, advantageously the elastic or flexible material comprises at least one of the element chosen among: an elastomer, for example silicon rubber based material, flexible epoxy resin, polyurethane resin.

According to one embodiment, at least one the stack separator comprise a weakness area, either in its volume or at the interface between said stack separator and the conductor strands, the weakness area being configured to break when submitted to a mechanical stress for which magnitude is higher than a predetermined magnitude so that said stack separator compensates, at least in part, the thermal expansion of the conductor elements when heated, advantageously in the 40° C. to 155° C. temperature range.

According to one embodiment, the stack separator comprises a stack of two bonded layers, the interface between the two bonded layers being the weakness area so that the two layers debond when submitted to a mechanical stress higher than the predetermined magnitude.

According to one embodiment, the stack separator comprises a thermoplastic glue which softens when heated.

According to one embodiment, the conductor strands are stacked in at least two adjacent columns said, respectively, first and second column; two lateral sides of the bundle of conductor strands, parallel to the stacking direction, are connected by two narrow sides.

According to one embodiment, each protection elements is disposed on a different narrow side.

According to one embodiment, the interspaces comprise a central interspace in between the adjacent columns.

According to one embodiment, the interspaces comprise inner interspace separating conductor strand within the columns.

According to one embodiment, the insulator wound around the bundle of conductor strands is in direct contact with the conductor strands at the two lateral sides.

According to one embodiment, the cross section of the conductor strands has a rectangular shape.

According to one embodiment, the conductor strands comprise copper.

According to one embodiment, the main insulation comprises a laminated structure of MICA and/or glass or film layers.

The invention also concerns windings of a stator for a rotating electrical machine, the windings comprising conductor bars according to the present invention.

The invention also concerns a stator of a rotating electrical machine comprising the windings according to the present invention.

The invention also concerns a rotating electrical machine comprising the stator according to the present invention.

BRIEF DESCRIPTION OF THE DRAWINGS

Other characteristics and advantages shall appear in the following description of embodiments of the conductor bar according to the invention, given by way of non-limiting examples, in reference to the annexed drawing wherein.

DETAILED DESCRIPTION OF SPECIFIC EMBODIMENTS

The present invention proposes a conductor bar, and notably a conductor bar for a stator of a rotating electrical machine. The conductor bar according to the present invention comprises conductor strands electrically isolated, and a main insulation wound around said conductor strands. The conductor bar further comprises a stack separator filling at least in part interspaces of the conductor strands, and two protection elements. At least one of the protection elements and/or the stack separator is/are configured to compensate, at least in part, the thermal expansion of said strands, and thus limit the debonding that would occur at the interface between the main insulation and the conductor strands.

Figure 1:
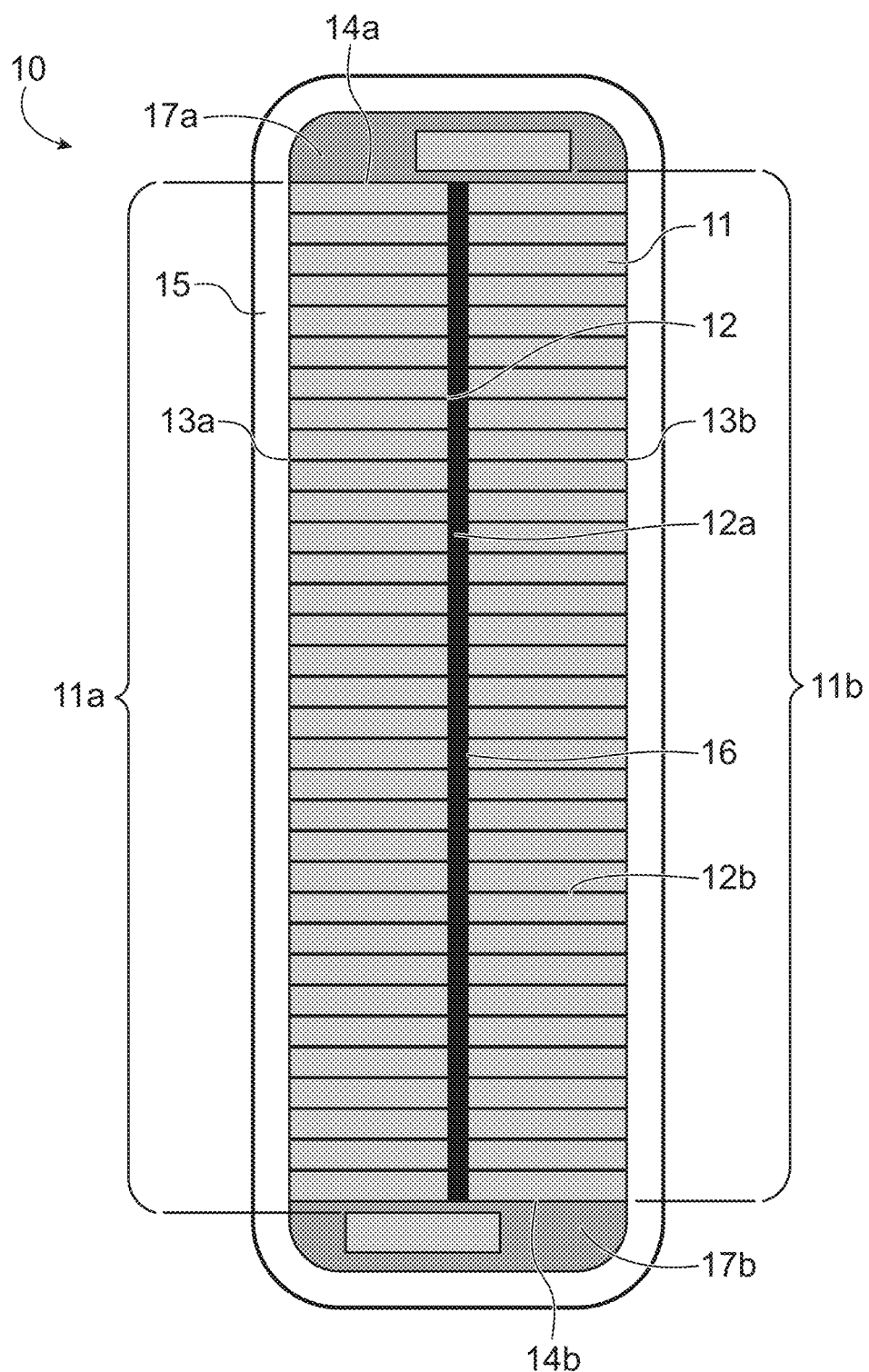
FIG. 1 is a cross section of a conductor bar according to the present invention.

FIG. 1 depicts an overall architecture a conductor bar 10 according to the present invention.

In particular, the conductor bar 10 comprises a bundle of parallel conductor strands 11 extending between two ends of the conductor bar 10, spaced apart by interspaces 12.

According to a preferred embodiment, the conductor strands 11 are stacked in at least two adjacent columns said, respectively, first 11a and second 11b column.

According to this preferred embodiment, the cross section of the bundle of conductor strands 11 has a rectangular shape. In particular, said cross section comprises two lateral sides 13a and 13b parallel to the stacking direction and connected by two narrow sides 14a and 14b.

Furthermore, the interspace 12 can comprise a central interspace 12a in between the adjacent columns, and/or inner interspaces 12b separating conductor strands 11 within columns 11a and 11b.

The conductor strands 11 can comprise a metallic element, and in particular can be made of copper.

The cross section of the conductor strands can be of rectangular shape eventually with rounded corners.

The conductor bar 10 further comprises a main insulation 15 wound around the bundle of conductor strands 11.

The main insulation 15 wound around the bundle of conductor strand is in direct contact with the conductor strands at the two lateral sides.

Furthermore, the main insulation 15 can comprise a laminated structure of MICA, like MICA tapes that can comprise glass or a polyester woven fabric or a film.

The conductor bar also comprises a stack separator 16 filling, at least in part, the interspaces 12, and notably filling the central interspace 12a and the inner interspaces 12b.

For example, the stack separator 16 has a Young modulus adjusted so that said stack separator 16 compensates, at least in part, the thermal expansion of the conductor elements when temperature changes, for example, in the 40° C. to 155° C. temperature range.

In particular, the Young modulus of the stack separator may be lower than 100 MPa, advantageously lower than 50 MPa.

In particular, the stack separator 16 can comprise an elastic or flexible material. For example the stack separator 16 can comprise a woven fabric impregnated or laminated with said elastic or flexible material.

The elastic or flexible material can comprise at least one of the elements chosen among: an elastomer, for example silicon rubber based material, flexible epoxy resin, polyurethane resin.

The elastic or flexible material can comprise an adhesion promotor, notably the adhesion promotor can be chosen among: (3-Mercaptopropyl)-trimethoxysilane (hereafter "MPTMS"), (3-(2,3 Epoxypropoxy)propyl)trimethoxysilan (hereafter "GLYMO").

Figure 2:
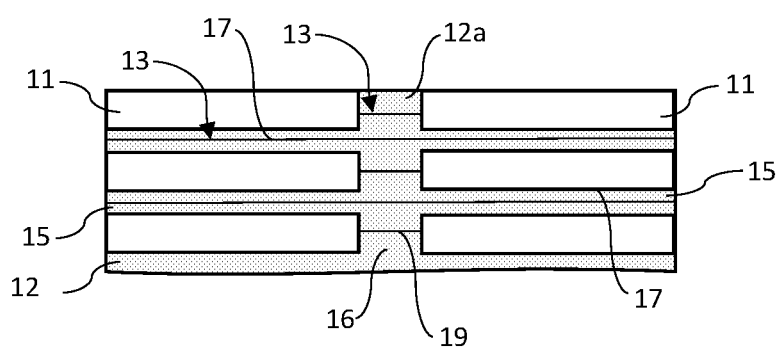
FIG. 2 is a cross section of a portion of a conductor bar depicting weakness areas in the stack separator filing.

Alternatively, as seen in FIG. 2, at least one stack separator 16 can comprise a weakness area 13, either in its volume or at the interface 17 between said stack separator and the conductor strands.

In particular, the weakness area 13 can be configured to break when submitted to a mechanical stress for which magnitude is higher than a predetermined magnitude so that said stack separator compensates, at least in part, the thermal expansion of the conductor elements 11 when heated, advantageously in the 40° C. to 155° C. temperature range.

According to a first variant of this alternative, the stack separator 16 can comprise a stack of two bonded layers 15, the interface 19 between the two bonded layers 15 being the weakness area so that the two layers debond when submitted to a mechanical stress higher than the predetermined magnitude.

According to a second variant of this alternative the stack separator 16 can comprise a thermoplastic glue which soften when heated.

The conductor bar 10 also comprises two protection elements 17a and 17b, intercalated in between the bundle of conductor strands 11 and the main insulation 15.

In particular, each of the two protection elements 17a and 17b can be positioned on a different narrow side 14a or 14b.

To this regard, at least one of the protection elements 17a, 17b can be configured to compensate, at least in part, the thermal expansion of the conductor elements (11) when temperature changes, advantageously in the 40° C. to 155° C. temperature range.

For example, the protection elements 17a and 17b have a Young modulus adjusted so that said elements 17a and 17b compensate, at least in part, the thermal expansion of the conductor elements when heated, for example, in the 40° C. to 155° C. temperature range.

In particular, the Young modulus of the protection elements 17a and 17b can be lower than 100 MPa, advantageously lower than 50 MPa.

In particular, the protection elements 17a and 17b can comprise an elastic or flexible material. For example, the protection elements 17a and 17b can comprise a woven fabric impregnated or laminated with said elastic or flexible material.

The elastic or flexible material comprises at least one of the element chosen among: an elastomer, for example silicon rubber based material, flexible epoxy resin, polyurethane resin.

The protection elements 17a and 17b can be electrically conducting.

Therefore, the conductor bar according to the present invention is less sensitive to mechanical stress when subjected to thermal cycling.

In particular, at least one of the stack separator and/or the protection elements, because of their adjusted Young modulus, can absorb and/or compensate the effect of thermal expansion of the conductor strands so that debonding at the interface between the main insulation and the conductor strands is limited, or even avoided.

Furthermore, the sharp corners of the protection elements are deformed and rounded by the main insulation wound around the bundle of conductor strands.

In other words, the rounded shape of the exposed corners of the protection element is imposed by the only action of the main insulation with no need of specific processing steps.

The invention also concerns windings of a stator for a rotating electrical machine, the windings comprising conductor bars according to present invention.

The invention also concerns a stator of a rotating electrical machine comprising the windings according to the present invention.

The invention also concerns a rotating electrical machine comprising the stator according to the present invention.

The invention claimed is:

1. A conductor bar for a stator winding of a rotating electrical machine, comprising
   a bundle of parallel conductor strands extending between two ends of the conductor bar and spaced apart by interspaces;
   a main insulation wound around the bundle of conductor strands;
   a stack separator filling, at least in part, the interspaces;
   protection elements intercalated in between the bundle of conductor strands and the main insulation wound around the bundle of conductor strands; and
   the stack separator formed from a flexible or elastic material configured to compensate, at least in part, thermal expansion of the conductor strands when temperature changes.

2. The conductor bar according to claim 1, wherein the stack separator has a Young modulus lower than 100 MPa so that it compensates, at least in part, the thermal expansion of the conductor elements when heated.

3. The conductor bar according to claim 1, wherein the protection elements comprise an elastic or flexible material.

4. The conductor bar according to claim 1, wherein the stack separator comprises a woven fabric laminated or impregnated with an elastic or flexible material.

5. The conductor bar according to claim 1, wherein the conductor strands are stacked in at least two adjacent columns, the stack of columns having lateral sides parallel to a stacking direction and narrow sides transverse to the stacking direction.

6. The conductor bar according to claim 5, wherein at least one of the protection elements is disposed on each of the narrow sides.

7. The conductor bar according to claim 5, wherein the interspaces comprise a central interspace between the adjacent columns.

8. The conductor bar according to claim 5, wherein the main insulation is in direct physical contact with the conductor strands at the two lateral sides.

9. The conductor bar according to claim 1, wherein the conductor strands comprise copper.

10. Windings of a stator for a rotating electrical machine, the windings comprising conductor bars according to claim 1.

11. A stator of a rotating electrical machine comprising the windings according to claim 10.

12. A rotating electrical machine comprising the stator according to claim 11.

13. The conductor bar according to claim 1, wherein the conductor strands comprise copper.

14. A conductor bar for a stator winding of a rotating electrical machine, comprising
    a bundle of parallel conductor strands extending between two ends of the conductor bar and spaced apart by interspaces;
    a main insulation wound around the bundle of conductor strands;
    a stack separator filling, at least in part, the interspaces;
    protection elements intercalated in between the bundle of conductor strand and the main insulation wound around said bundle; and
    wherein the stack separator comprises a weakness area in its volume or at an interface between the stack separator and the conductor strands, the weakness area configured to break when submitted to a mechanical stress higher than a predetermined magnitude so that the stack separator compensates, at least in part, the thermal expansion of the conductor elements.

15. The conductor bar according to claim 14, wherein the stack separator comprises a stack of two bonded layers, an interface between the two bonded layers being the weakness area so that the two bonded layers debond when submitted to the mechanical stress.

16. The conductor bar according to claim 14; wherein the stack separator comprises a thermoplastic glue that softens when heated.

17. A conductor bar for a stator winding of a rotating electrical machine, comprising
    a bundle of parallel conductor strands extending between two ends of the conductor bar and spaced apart by interspaces;
    a main insulation wound around the bundle of conductor strands;
    a stack separator filling, at least in part, the interspaces;
    protection elements completely filling a space between the bundle of conductor strands and the main insulation; and the protection elements formed from a flexible or elastic material configured to compensate thermal expansion of the conductor strands when temperature changes.

18. The conductor bar according to claim 17, wherein the protection elements have a Young modulus lower than 100 MPa so that it compensates, at least in part, the thermal expansion of the conductor elements when heated.

19. The conductor bar according to claim 17, wherein the protection elements comprise a woven fabric laminated or impregnated with an elastic or flexible material.

20. The conductor Tar according to claim 17, wherein the conductor strands are stacked in at least two adjacent columns, the stack of columns having lateral sides parallel to a stacking direction and narrow sides transverse to the stacking direction, and wherein at least one of the protection elements is disposed on each of the narrow sides.

21. The conductor bar according to claim 20, wherein the interspaces comprise a central interspace between the adjacent columns.

22. The conductor bar according to claim 20, wherein the main insulation is in direct physical contact with the conductor strands at the two lateral sides.

23. Windings of a stator for a rotating electrical machine, the windings comprising conductor bars according to claim 17.

24. A stator of a rotating electrical machine comprising the windings according to claim 23.

25. A rotating electrical machine comprising the stator according to claim 24.

* * * * *